US 11,559,959 B2

(12) United States Patent
Zastrow et al.

(10) Patent No.: US 11,559,959 B2
(45) Date of Patent: Jan. 24, 2023

(54) MACHINING METHOD, APPLICATION TOOL, AND MACHINING ARRANGEMENT FOR MODIFYING OR REPAIRING A SURFACE SPOT OF A WORKPIECE SURFACE OF A FIBER COMPOSITE WORKPIECE (71) Applicant: Airbus Operations GmbH, Hamburg (DE)

(72) Inventors: Alexander Zastrow, Hamburg (DE); Roman Kleinpeter, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 261 days.

(21) Appl. No.: 16/823,866

(22) Filed: Mar. 19, 2020

(65) Prior Publication Data

US 2020/0298511 A1  Sep. 24, 2020

(30) Foreign Application Priority Data

Mar. 20, 2019  (DE) ...................... 10 2019 107 202.6

(51) Int. Cl.
*B29C 73/30* (2006.01)
*B29C 73/06* (2006.01)
(Continued)

(52) U.S. Cl.
CPC .............. *B29C 73/30* (2013.01); *B29C 73/06* (2013.01); *B29C 65/483* (2013.01);
(Continued)

(58) Field of Classification Search
CPC ........ B29C 2073/262; B29C 2073/264; B29C 2073/266; B29C 37/04; B29C 37/06;
(Continued)

(56) References Cited

U.S. PATENT DOCUMENTS 5,190,611 A * 3/1993 Cologna ............... B29C 73/063
29/402.11
5,928,448 A  7/1999 Daws
(Continued)

FOREIGN PATENT DOCUMENTS

DE          4019744 A1   1/1992
DE    102015101328 A1   8/2016
(Continued)

OTHER PUBLICATIONS

European Search Report for corresponding European Patent Application No. 20163885 dated Sep. 18, 2020.
German Search Report; priority document.

*Primary Examiner* — Philip C Tucker
*Assistant Examiner* — Brian R Slawski
(74) *Attorney, Agent, or Firm* — Greer, Burns & Crain, Ltd.

(57) ABSTRACT

To reduce the processing time in the case of repairing of excessively countersunk bolt openings or surface damage in fiber composite workpieces, it is proposed to countersink the corresponding surface spot to produce a contact surface and a depression for a fiber composite insert body. The fiber composite insert body is placed onto the contact surface and is fixed on the fiber composite workpiece in the depression. In the case of an excessively countersunk bolt opening, a new bolt opening is drilled into the fiber composite insert body, which new bolt opening is subsequently countersunk to the correct countersunk bore depth. In the case of the method, a three-legged application tool can be used which positions and orients the fiber composite insert body correctly and presses it onto the fiber composite workpiece during the curing of the adhesive.

15 Claims, 12 Drawing Sheets

(51) Int. Cl.
*B29K 105/00* (2006.01)
*B29C 65/72* (2006.01)
*B29C 65/00* (2006.01)
*B29C 65/48* (2006.01)
*B29C 65/56* (2006.01)

(52) U.S. Cl.
CPC ............ *B29C 65/565* (2013.01); *B29C 65/72* (2013.01); *B29C 66/02242* (2013.01); *B29C 66/02245* (2013.01); *B29C 66/301* (2013.01); *B29C 66/30325* (2013.01); *B29C 66/721* (2013.01); *B29K 2105/0097* (2013.01); *B29K 2105/253* (2013.01)

(58) Field of Classification Search
CPC ......... B29C 37/24; B29C 37/26; B29C 37/30; B29C 65/00; B29C 65/48; B29C 65/483; B29C 65/4835; B29C 65/56; B29C 65/565; B29C 65/72; B29C 66/022; B29C 66/0224; B29C 66/02241; B29C 66/02242; B29C 66/02245; B29C 66/301; B29C 66/30325; B29C 66/721; B29C 73/10; B29C 73/12; B29C 73/04; B29C 73/06; B29C 73/24; B29C 73/26; B29C 73/30; B29K 2105/0097; B29K 2105/253

USPC ......... 156/60, 91, 92, 94, 98, 153, 154, 250, 156/256, 257, 293, 294, 303.1, 307.1; 428/63

See application file for complete search history.

(56) References Cited

U.S. PATENT DOCUMENTS

| | | | |
|---|---|---|---|
| 10,232,573 B2 | 3/2019 | Siegfried Herrmann et al. | |
| 2007/0177330 A1 | 8/2007 | Ackerman et al. | |
| 2009/0208691 A1 | 8/2009 | Whitworth et al. | |
| 2013/0232751 A1* | 9/2013 | Hertel | B32B 3/02 29/402.18 |
| 2013/0264110 A1* | 10/2013 | Willmot | B64C 3/34 174/521 |
| 2017/0274485 A1 | 9/2017 | Queant et al. | |
| 2017/0341322 A1* | 11/2017 | Joachim | B32B 27/322 |
| 2019/0061280 A1 | 2/2019 | Whitworth et al. | |
| 2020/0031069 A1* | 1/2020 | Lewis | B32B 5/26 |

FOREIGN PATENT DOCUMENTS

| | | | | |
|---|---|---|---|---|
| EP | 3248768 A1 | | 11/2017 | |
| GB | 2504206 A | * | 1/2014 | ............ B29C 73/02 |

* cited by examiner

MACHINING METHOD, APPLICATION TOOL, AND MACHINING ARRANGEMENT FOR MODIFYING OR REPAIRING A SURFACE SPOT OF A WORKPIECE SURFACE OF A FIBER COMPOSITE WORKPIECE

CROSS-REFERENCES TO RELATED APPLICATIONS

This application claims the benefit of the German patent application No. 102019107202.6 filed on Mar. 20, 2019, the entire disclosures of which are incorporated herein by way of reference.

FIELD OF THE INVENTION

The invention relates to a machining method for modifying or repairing a surface spot of a workpiece surface of a fiber composite workpiece. Furthermore, the invention relates to an application tool and to a machining arrangement which are used in each case in the machining method.

BACKGROUND OF THE INVENTION

During the assembly of monolithic fiber composite components, excessively countersunk holes/openings, in particular, are a frequently occurring phenomenon. Currently used repair methods have a long processing time, can require decisions by engineers, and therefore result in compromises which can be associated with high costs.

The holes which are excessively countersunk or are produced in some other way not according to the specification are usually machined and repaired by way of inserting of a metal sleeve (for example, made from titanium), heating of the repair region and the use of oversized bolts (in comparison with the specification). Furthermore, the holes have up to now been machined and repaired with resin (resin repair).

Furthermore, relatively small surface damage of limited extent can also be produced during the use of the fiber composite components, for example by way of particle impact.

SUMMARY OF THE INVENTION

The invention is based on an object of providing an improved machining method and expedient apparatuses for carrying it out.

The invention provides a machining method for modifying or repairing a surface spot of a workpiece surface of a fiber composite workpiece, the surface spot first of all not corresponding to a design specification, and corresponding to the design specification after the modification, having the steps:
1.1 countersinking of the surface spot in order to produce a contact surface and a depression; and
1.2 placing of a fiber composite insert body onto the contact surface, and fixing of the fiber composite insert body on the fiber composite workpiece in the depression.

It is preferred that, in particular in step 1.1, the contact surface is produced by means of conical countersinking, with the result that the contact surface has the shape of a cone envelope surface.

It is preferred that, in particular in step 1.1, the contact surface is produced by means of step countersinking, with the result that the contact surface has the shape of a cylindrical shell surface.

It is preferred that, in particular in step 1.2, the placing and/or fixing take/takes place in such a way that the surface spot is flat or flush with the workpiece surface.

It is preferred that, in particular in step 1.2, the fiber composite insert body is positioned concentrically with respect to the depression on account of the interaction with the contact surface.

It is preferred that the fiber composite insert body is of conical or frustoconical configuration.

It is preferred that the fiber composite insert body is of cylindrical configuration.

It is preferred that step 1.2 comprises the pressing of the fiber composite insert body onto the fiber composite workpiece.

It is preferred that preferred that step 1.2 comprises the adhesive bonding of the fiber composite insert body to the fiber composite workpiece, in particular on the adhesive surface.

It is preferred that, in particular in step 1.2, the fiber composite insert body protrudes beyond the workpiece surface in the axial direction of the depression.

It is preferred that step 1.2 comprises the removal of the fiber composite insert body until the latter is flat and/or flush with the workpiece surface.

It is preferred that the removal takes place in such a way that, although any coatings of the workpiece surface, in particular in the surrounding region of the surface spot, are gripped, in particular are roughened, they are not removed.

It is preferred that, in particular in step 1.2, the removal takes place by means of grinding.

It is preferred that, after step 1.2 and, if present, preferably before step 1.3, a functional coating, in particular lightning protection materials, are re-established.

The machining method preferably comprises the step:
providing of the fiber composite insert body by means of cutting out of the fiber composite insert body from a fiber composite body.

It is preferred that the cutting out takes place by means of drilling into the fiber composite body.

It is preferred that, in the case of the cutting out, the fiber composite insert body is cut out as a conical shape or a frustoconical shape.

It is preferred that, in the case of the cutting out, the fiber composite insert body is cut out as a cylindrical shape.

It is preferred that, in the case of the cutting out, the pilot opening is produced.

It is preferred that, in the case of the cutting out, the pilot opening is drilled.

It is preferred that the surface spot is a countersunk bolt opening, step 1.1 comprising further countersinking of the countersunk bolt opening in order to produce the contact surface.

It is preferred that the countersunk bolt opening which is countersunk further forms the depression.

It is preferred that the machining method comprises a step 1.3 which comprises a production of an end bolt opening in the fiber composite insert body in accordance with the design specification.

It is preferred that the countersunk bolt opening has a countersunk bore depth, and the end bolt opening has an end countersunk bore depth, the countersunk bore depth and the end countersunk bore depth being defined in each case relative to a workpiece surface of the fiber composite workpiece.

It is preferred that the machining method modifies, in particular reduces, the countersunk bore depth to the end countersunk bore depth.

It is preferred that the machining method comprises a step 1.4 which comprises countersinking of the end bolt opening to the end countersunk bore depth.

It is preferred that, in particular in step 1.2, the fiber composite insert body is positioned concentrically with respect to the countersunk bolt opening on account of the interaction with the contact surface.

It is preferred that, in particular in step 1.2, the fiber composite insert body has a pilot opening for positioning the fiber composite insert body during placing.

It is preferred that, in particular in step 1.2, the fiber composite insert body has a pilot opening for positioning the fiber composite insert body during fixing.

It is preferred that, in particular in step 1.2, the fiber composite insert body has a pilot opening for orienting the fiber composite insert body during placing.

It is preferred that, in particular in step 1.2, the fiber composite insert body has a pilot opening for orienting the fiber composite insert body during fixing.

It is preferred that the pilot opening is configured as a through opening or through bore.

It is preferred that the pilot opening is configured as a blind hole or blind bore.

It is preferred that the pilot opening is positioned concentrically with respect to the countersunk bolt opening on account of the interaction of the fiber composite insert body with the contact surface.

It is preferred that the pilot opening is oriented parallel to the countersunk bolt opening on account of the interaction of the fiber composite insert body with the contact surface.

It is preferred that, in particular in step 1.3, the end bolt opening is produced by way of enlarging of the pilot opening.

It is preferred that, in particular in step 1.3, the production takes place by means of drilling, in particular reaming.

It is preferred that, in particular in step 1.4, the end countersunk bore depth is selected in such a way that a bolt which is intended for the countersunk bolt opening and was not flush with the workpiece surface when the bolt was inserted into the countersunk bolt opening is then flush with the workpiece surface, in particular within the permissible tolerances, when the bolt is inserted into the end bolt opening.

It is preferred that, in particular in step 1.2, the fiber composite insert body protrudes beyond the workpiece surface in the axial direction of the countersunk bolt opening.

It is preferred that step 1.2 comprises the removal of the fiber composite insert body until the latter is flat and/or flush with the workpiece surface.

The invention therefore provides, in particular, a machining method for modifying, in particular decreasing, a countersunk bore depth of a countersunk bolt opening, in particular for a round bolt, of a fiber composite workpiece which is preferably configured for an aircraft component or an aircraft, to an end countersunk bore depth of an end bolt opening, the countersunk bore depth and the end countersunk bore depth being defined in each case relative to a workpiece surface of the fiber composite workpiece, having the steps:

1.1 further countersinking of the countersunk bolt opening in order to produce a contact surface;
1.2 placing of a fiber composite insert body onto the contact surface, and fixing of the fiber composite insert body on the fiber composite workpiece;
1.3 producing of the end bolt opening at least partially in the fiber composite insert body; and
1.4 countersinking of the end bolt opening to the end countersunk bore depth.

The machining method can have preferably one, a plurality or all of the above-described preferred refinements.

The invention provides an application tool for positioning, orienting and/or pressing a fiber composite insert body onto an adhesive surface of a bolt opening of a fiber composite workpiece, the application tool comprising a supporting frame which is configured for planar support of the application tool on a workpiece surface of the fiber composite workpiece, a guide bolt which is configured for positioning and orienting the fiber composite insert body when the guide bolt grips the fiber composite insert body, and a pressing device which is configured for applying a pressing force to the fiber composite insert body in the direction of the fiber composite workpiece.

Furthermore, the invention provides a machining arrangement comprising a preferred application tool, a fiber composite insert body and a fiber composite workpiece with a depression, in particular a bolt opening, which has an adhesive surface, the supporting frame gripping the fiber composite workpiece, the fiber composite insert body being gripped by the guide bolt in such a way that the fiber composite insert body is arranged partially in the depression and concentrically with respect to the depression, the fiber composite insert body being pressed onto the adhesive surface by the pressing device.

The fiber composite workpiece is preferably used in an aircraft component, for example a fuselage component, of an aircraft. A use in marine or automotive engineering or in the field of wind energy is also conceivable.

It is to be noted that the numbering used here in method steps serves merely for simpler reference and does not imply a sequence.

In the following text, advantages and effects of the methods and apparatuses described herein will be described in greater detail. It should be noted that the methods and apparatuses are not restricted to the advantages and effects as a result. Furthermore, all advantages and effects do not have to be realized in every embodiment of the invention.

By means of the machining method, a correction can take place of damage of a fiber composite workpiece (for example, on account of impact) by way of the insertion of a fiber composite insert body into the damage spot after the preceding countersinking. In this way, a fiber composite workpiece can be obtained which has a flat surface without a hole, bore and/or countersunk portion.

By way of the measures described herein, the nominal bolts/fasteners intended for the bolt opening can be used even after the machining and/or repair of the bolt opening. In the present case, the focus is on the modification or reduction of the countersunk bore depth of the bolt openings; in other words, the correction of a countersunk bore depth to a (desired) end countersunk bore depth.

Furthermore, damage can be removed by way of the method by means of the introduction of a countersunk bore, for example a conical countersunk bore or a step countersunk bore, and the defective material can be replaced by the fiber composite insert body.

The machining method described herein which is also called a conical repair method can be of such simple design that simple training can be sufficient, in order to carry out the machining method reliably in accordance with the standards which are customary in aerospace.

The fiber composite workpiece can be, for example, a prepreg material. The fiber composite body, from which the fiber composite insert body can be cut out, is preferably likewise a prepreg material.

In order to fix the fiber composite insert body, two-component adhesives which can be based on epoxy are preferably used. Here, the adhesive is preferably selected in such a way that curing can take place rapidly at customary room temperature. Furthermore, the adhesive can be selected in accordance with the fact that it has already been used in the manufacture for other attachment parts, such as connecting clips of fiber composite structures. The standardized availability of the adhesive in pre-manufactured application apparatuses, for example syringes, is also helpful here.

A dedicated tool can be used in the case of cutting out of the fiber composite insert body. It can be advantageous to first of all adhesively bond the preferably plate-shaped fiber composite body to a substrate, for example made from wood, and to only then cut out the fiber composite insert body. Tests of the applicant have shown that no damage of the material could be detected in the case of an arrangement of this type, even with microscopic surface examination.

In particular, no fiber excision from the cut surface could be seen, which cut surface merely had relatively small machining marks.

Separate cleaning of the fiber composite insert body, in particular by means of an ultrasonic bath, has also proven advantageous.

Before the machining method, a deviation in the countersunk bore depth can initially be detected, which deviation leads to a bolt which is inserted into the bolt opening lying at an excessive depth below the workpiece surface of the fiber composite workpiece. After the removal of the bolt, the existing countersunk bore depth can then be increased (preferably from approximately 0.2 mm) Subsequently, direct cleaning of the cut surface can take place. Adhesive is applied to the cleaned cut surface. The adhesive can be applied to both parts, that is to say, the fiber composite workpiece and the fiber composite insert body. The fiber composite insert body is inserted into the bolt opening and is positioned/oriented. The curing of the adhesive takes place at room temperature, that is to say, without the application of additional heat (depending on the adhesive system, however, a local thermal treatment can be preferred or necessary). The adhesive is cured, for example, for two hours. The adhesive quantity is preferably overdimensioned.

The fiber composite insert body is preferably overdimensioned, with the result that it protrudes beyond the workpiece surface. In this case, the fiber composite insert body can be ground down until the fiber composite insert body is flush with the workpiece surface. During grinding, it is preferably ensured that any functional coatings of the fiber composite workpiece are not damaged. These can include a lightning protection material, for example in the form of a metal mesh.

A hole is drilled or an opening which has already been pre-drilled is widened in the fiber composite insert body, with the result that the original bolt can fundamentally be received. Finally, the newly drilled hole is countersunk to the desired countersunk bore depth, with the result that the bolt which is inserted into the hole is flush with the workpiece surface.

Tests of the applicant, in the case of which the time requirement of the method described herein has been compared with the conventional method, have resulted in the fact that a significant time advantage of approximately seven hours (virtually a complete customary working day) is made possible. If the method which is described herein is used instead of a shank repair, the time advantage can be far greater.

One or more inspections can optionally be carried out during the machining.

The following advantages are preferably desired in relation to the machining and/or application tool:
improvement of the perpendicularity of the drilling axis of the existing cylindrical hole relative to the workpiece surface;
improvement of the perpendicularity of the pilot opening in the fiber composite insert body or fiber composite insert cone relative to the workpiece surface;
improvement of the positioning of the cylindrical hole region with respect to the pilot opening in the fiber composite insert body or fiber composite insert cone;
applying of a certain pressure to the fiber composite insert body or fiber composite insert cone and the adhesive layer during the curing, in order to achieve an adhesive line thickness which is as small as possible and/or in order to close pores, in particular as a result of an overdimensioned adhesive quantity.

The tool can be manufactured conventionally or by means of modern additive manufacturing methods. The supporting frame of the application tool is preferably configured as a tripod.

It should be noted that, in the present case, the concept is explained, in particular, on the basis of a repair of a bolt opening. The invention is not restricted hereto, however. Thus, instead of blind bores, through openings can also be used, and vice versa. The countersunk bores are also not restricted to conical countersunk bores; step countersunk bores can also be used. In particular, depending on the application, suitable combinations of the measures can also be used. As an alternative or in addition to the bolt opening, surface damage can also be repaired by means of the method which is described herein.

BRIEF DESCRIPTION OF THE DRAWINGS

Exemplary embodiments will be described in greater detail on the basis of the appended diagrammatic drawings, in which.

DETAILED DESCRIPTION OF THE PREFERRED EMBODIMENTS

Figure 1:
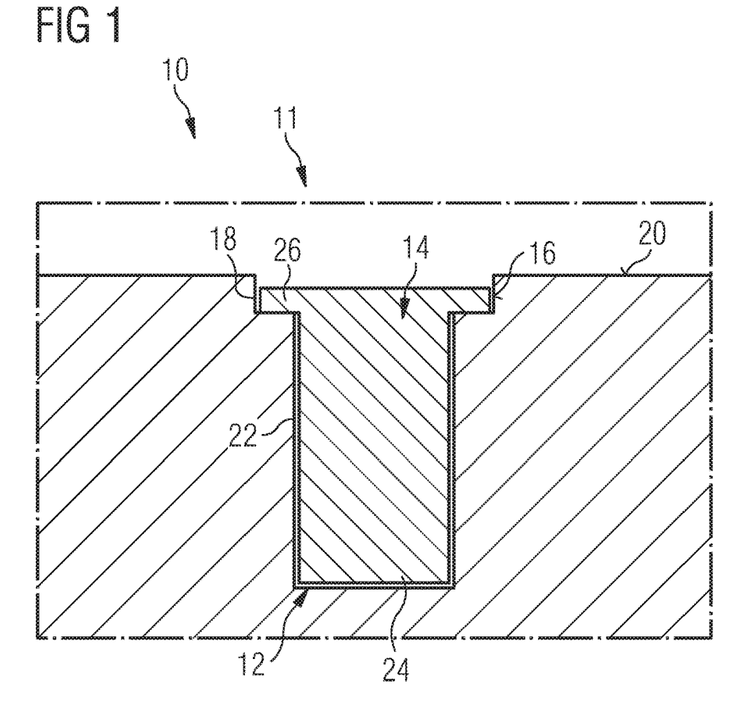
FIG. 1 shows a cross-sectional view of a countersunk bolt opening.
Figure 2:
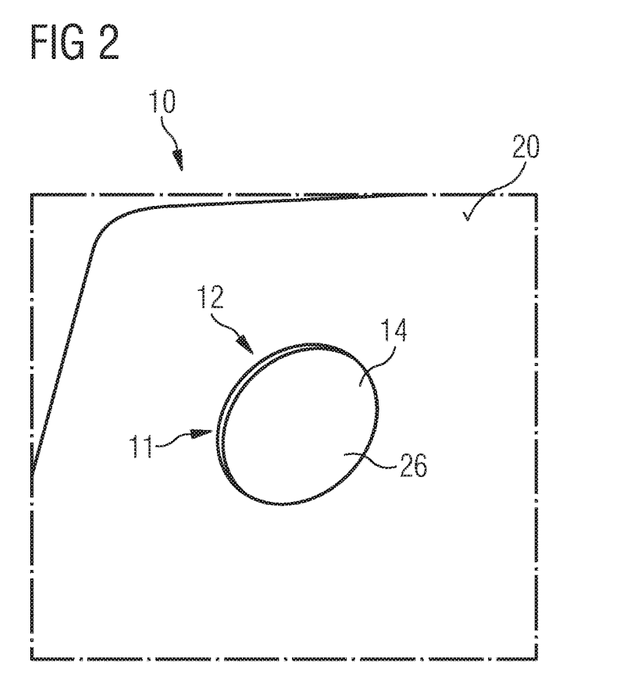
FIG. 2 shows a perspective view of the countersunk bolt opening.

Reference is made, first of all, to FIG. 1 and FIG. 2 which show a fiber composite workpiece 10. The fiber composite workpiece 10 can be, for example, part of an aircraft component, for instance a fuselage panel or a trim element.

The fiber composite workpiece 10 has a surface spot 11 to be machined. The surface spot 11 can be, for example, a countersunk bolt opening 12. The surface spot 11 can also be damage of the fiber composite workpiece 10, which damage has been produced by way of impact. In the following text, the examples will be described on the basis of the countersunk bolt opening 12. It can be seen, however, that the measures which are described herein are also suitable for damaged surface spots 11.

The fiber composite workpiece 10 has the countersunk bolt opening 12 for a bolt 14. The bolt 14 is, for example, a round bolt and can have a thread.

The countersunk bolt opening 12 has a countersunk bore 16, for example in a cylindrical form. The countersunk bore 16 has a countersunk bore depth 18. The countersunk bore depth 18 is measured from a workpiece surface 20 of the fiber composite workpiece 10. The countersunk bolt opening 12 is shown here as a blind bore, but can also be a through hole or another type of hole.

Furthermore, the countersunk bolt opening 12 has a shank region 22 for receiving a bolt shank 24 of the bolt 14. Furthermore, the bolt 14 comprises a bolt head 26 which can be arranged in the countersunk bore 16.

As can be seen from FIG. 1, in particular, the bolt head 26 is arranged at a greater depth than the workpiece surface 20, with the result that the bolt 14 is not flush with the workpiece surface 20. The spacing between the bolt 14 and the workpiece surface 20 is as a rule less than 1 mm, but is more than the allowed tolerance permits. Therefore, the bolt 14 does not correspond to a design specification.

In order then to modify the countersunk bore depth 18 in such a way that the bolt 14 is flush with the workpiece surface 20, the fiber composite workpiece 10 is machined as described in the following text.

Figure 3:
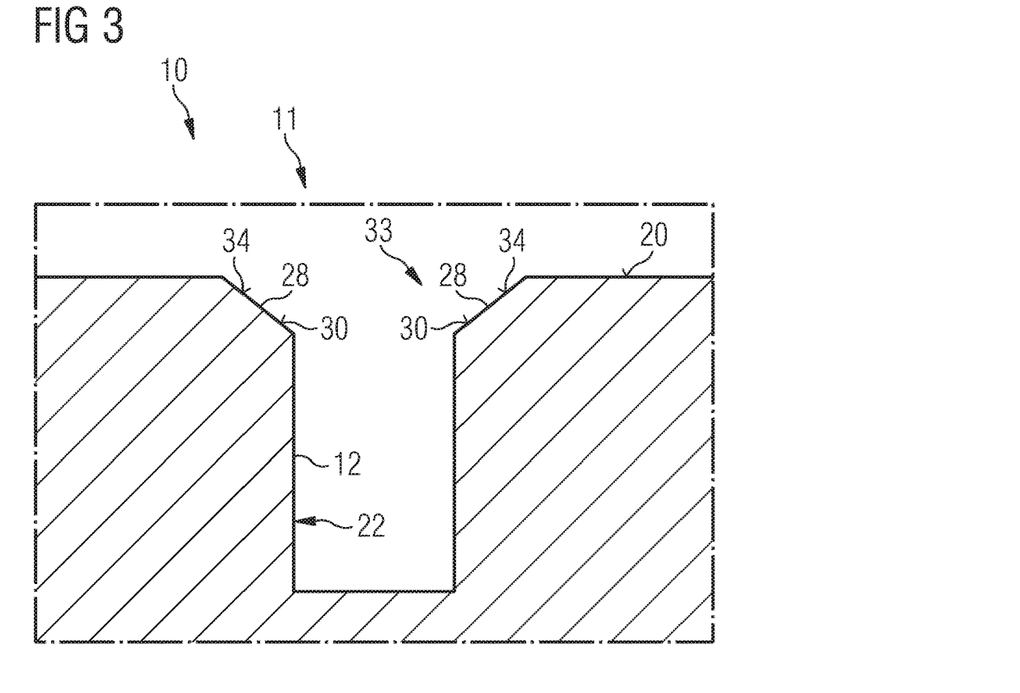
FIG. 3 shows a cross-sectional view of a countersunk bolt opening which has been countersunk further.
Figure 4:
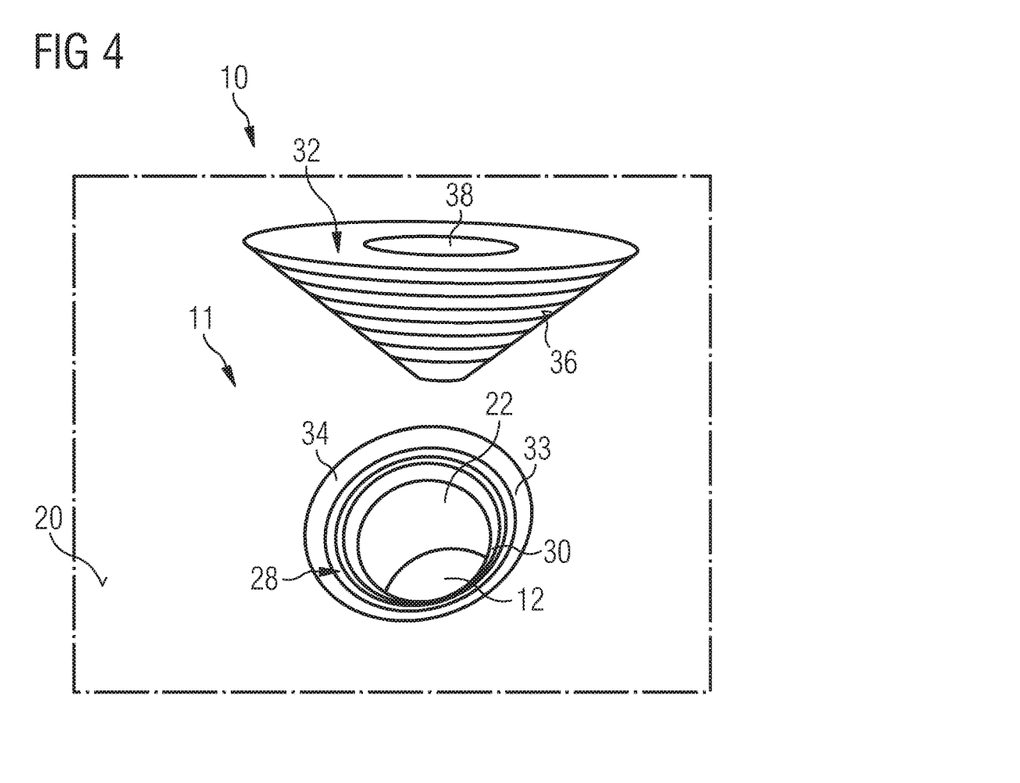
FIG. 4 shows a perspective view of the countersunk bolt opening which has been countersunk further.

As shown in FIG. 3 and FIG. 4, the countersunk bolt opening 12 is countersunk further by means of a conical countersink tool, in order to obtain a conical countersunk bore 28. Here, the countersunk bore 16 (or damage) can be removed completely. The cone angle is preferably between 90° and 130°. In particular, the cone angle is 100°. Other angles are not ruled out, depending on the application.

In addition, the conical countersunk bore provides a contact surface 30 for a fiber composite insert body 32 which is preferably of conical or frustoconical configuration. The contact surface 30 is preferably cleaned, in order to obtain an adhesive surface 34.

Furthermore, the countersunk bore provides a depression 33 for the fiber composite insert body 32.

Resin material is then applied as adhesive 35 to the adhesive surface 34 and a circumferential surface 36 of the fiber composite insert body 32. The quantity of adhesive 35 is preferably overdimensioned, in order to close any pores on the adhesive surface 34 and/or the circumferential surface 36. Furthermore, air bubbles which are enclosed by way of the adhesive can be moved out of the adhesive region.

Figure 5:
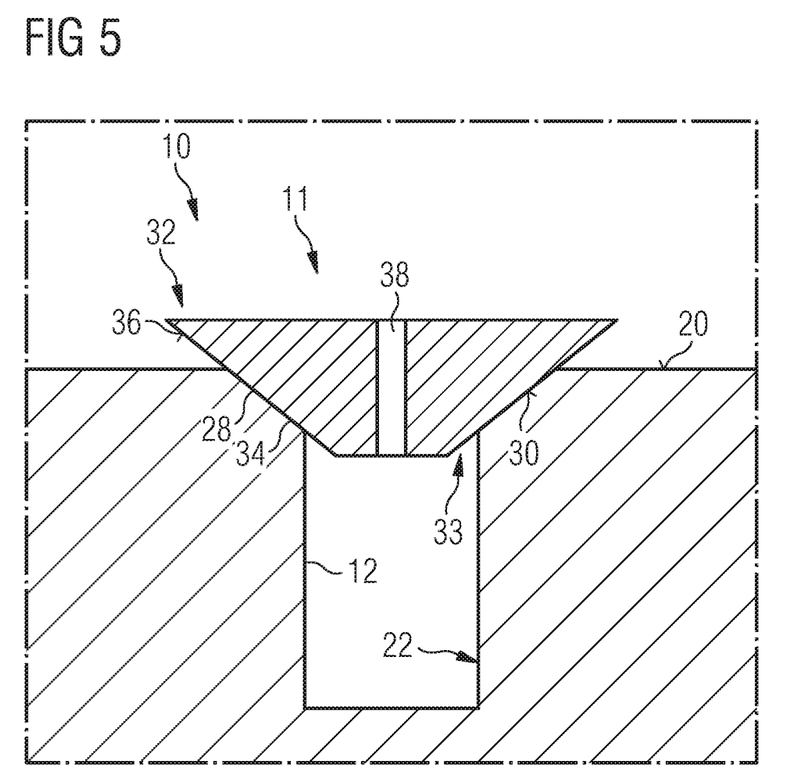
FIG. 5 shows a cross-sectional view of the countersunk bolt opening with a fiber composite insert body.
Figure 6:
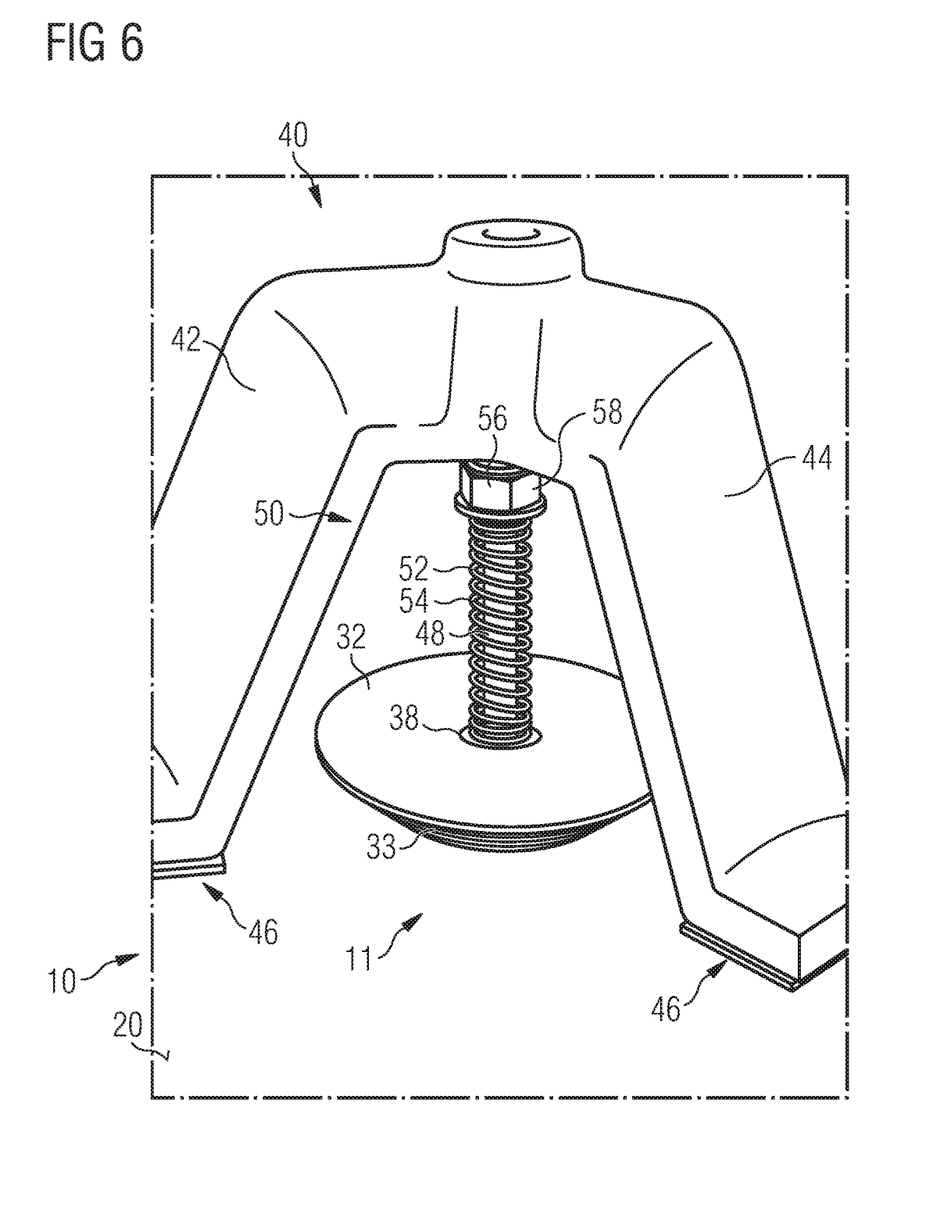
FIG. 6 shows one exemplary embodiment of an application tool.
Figure 7:
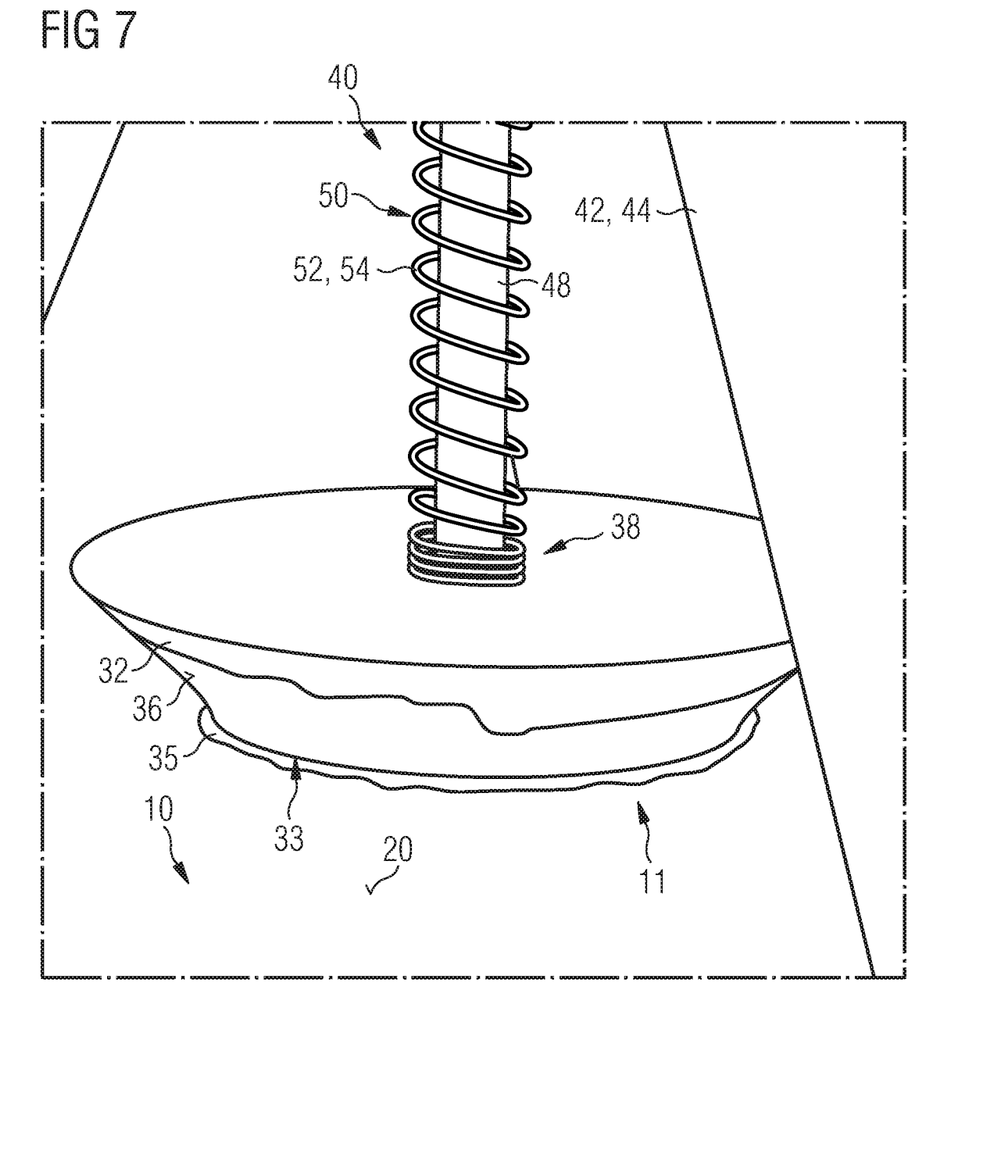
FIG. 7 shows a detailed view of the fiber composite insert body from FIG. 6.

As shown in greater detail in FIG. 5 to FIG. 7, the fiber composite insert body 32 is inserted into the countersunk bolt opening 12 and is placed onto the contact surface 30, in particular the adhesive surface 34. The fiber composite insert body 32 can have a pilot opening 38 for positioning and orienting. For this purpose, an application tool 40 can be used.

The application tool 40 has a supporting frame 42. The supporting frame 42 is preferably configured as a tripod 44, and can be fastened releasably to the fiber composite workpiece 10, for example by means of releasable adhesive connections 46. Vacuum suction cups or magnets can also be used for the releasable fastening.

Furthermore, the application tool 40 comprises a guide bolt 48 which is supported on the supporting frame 40 such that it can be displaced vertically. The guide bolt 48 can grip the fiber composite insert body 32 and, in particular, can engage into the pilot opening 38, in order to position the fiber composite insert body 32 concentrically with respect to the countersunk bolt opening 12 and/or to orient it parallel to the countersunk bolt opening 12.

In addition, the application tool 40 can have a pressing device 50, by means of which a force can be exerted on the fiber composite workpiece 10 in the axial direction of the fiber composite insert body 32 in the direction of the fiber composite workpiece 10. In the present case, the pressing device 50 comprises an elastic element 52, for example a helical spring 54, the exerted force of which can be set by way of a setting element 56, for example a nut 58.

The fiber composite insert body 32 can be positioned or oriented concentrically with respect to and/or parallel to the countersunk bolt opening 12, in particular, on account of the interaction of the fiber composite insert body 32 with the contact surface 30, optionally with the aid of the application tool 40.

Figure 8:
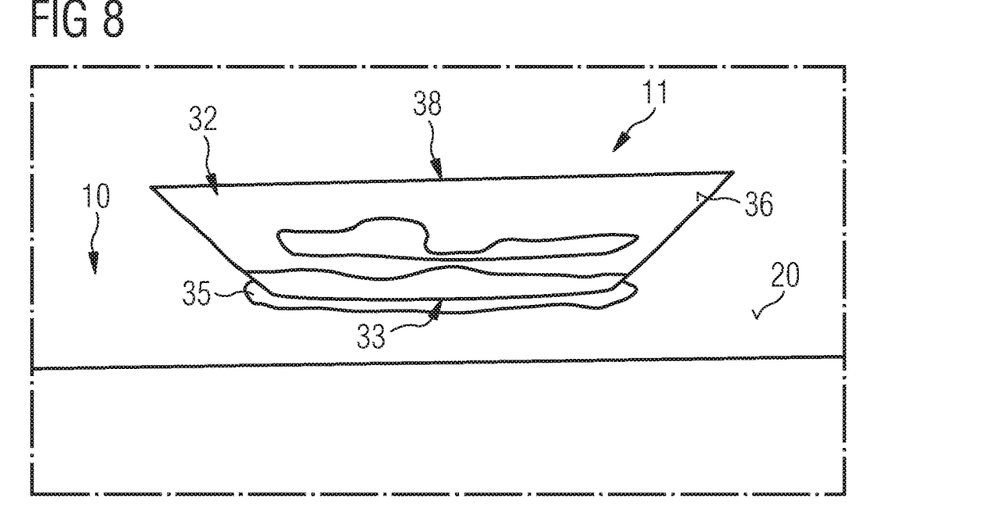
FIG. 8 shows a further detailed view of the fiber composite insert body from FIG. 6.
Figure 9:
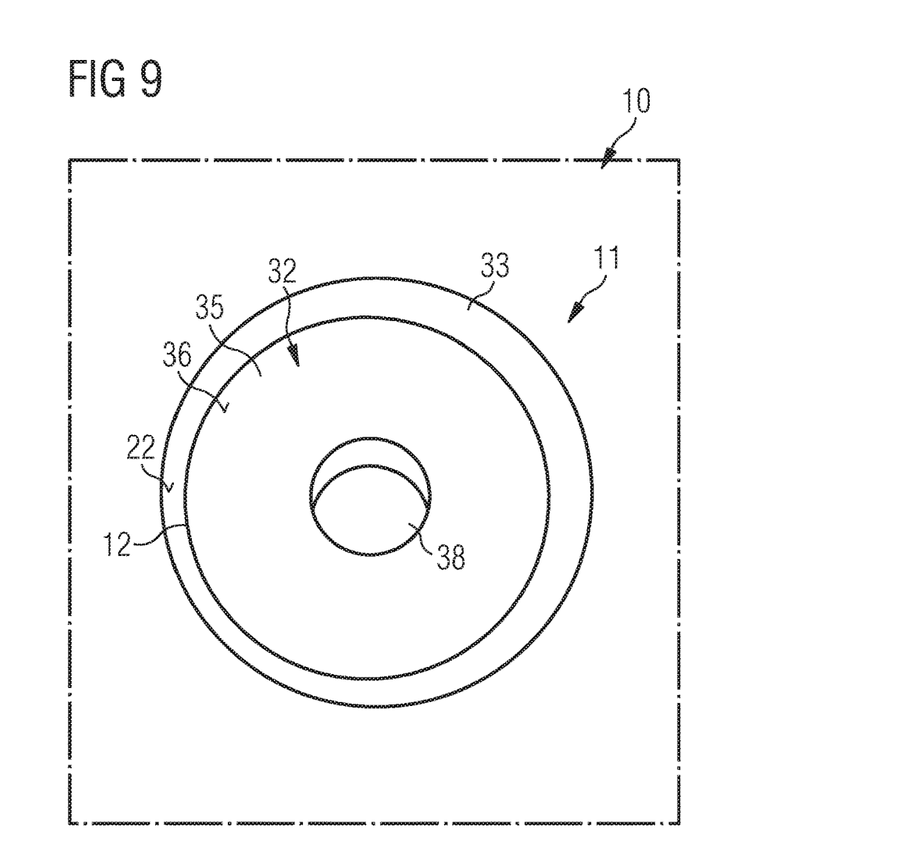
FIG. 9 shows a view of the fiber composite insert body from FIG. 6 from below.

The result of the step can be seen, in particular, in FIG. 8 and FIG. 9. The fiber composite insert body 32 is preferably configured in such a way that it protrudes beyond the workpiece surface 20 in the axial direction of the countersunk bolt opening 12. Furthermore, the excessive quantity of adhesive 35 can be seen.

Figure 10:
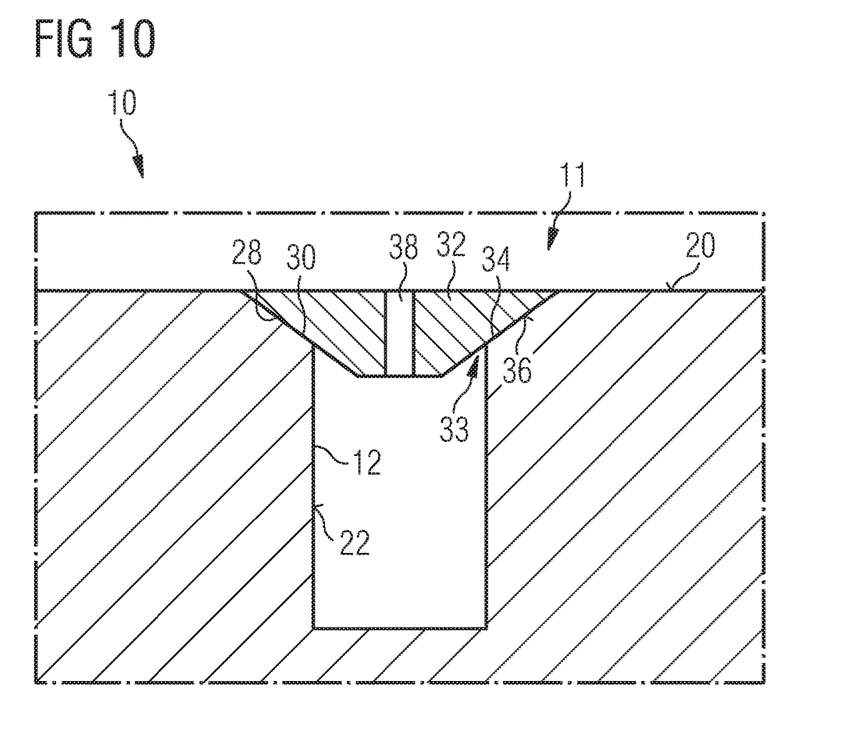
FIG. 10 shows a cross-sectional view with a fiber composite insert body which has had material removed.
Figure 11:
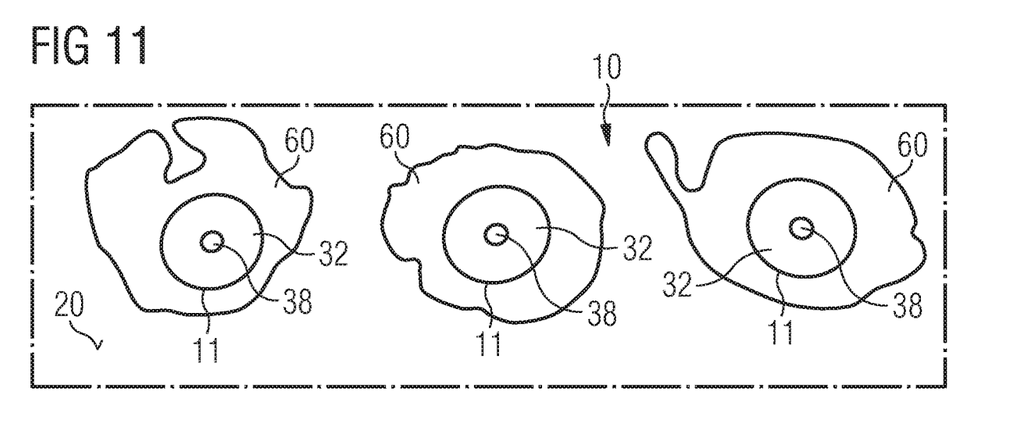
FIG. 11 shows a perspective view of a fiber composite workpiece.
Figure 12:
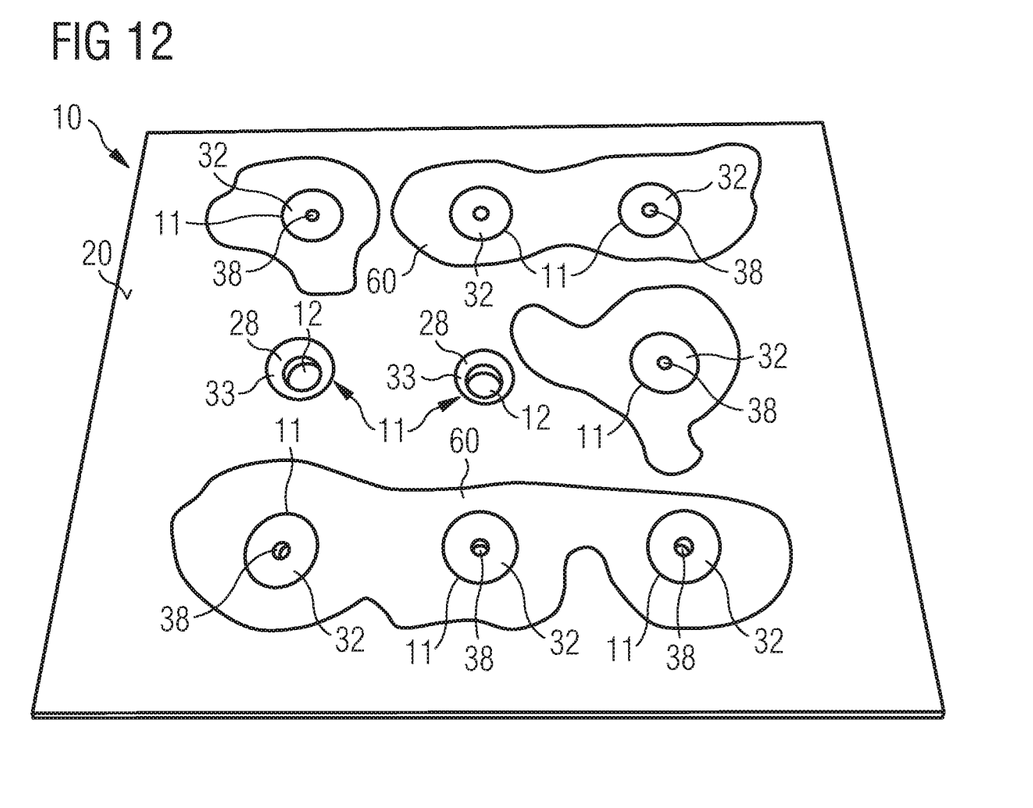
FIG. 12 shows a perspective view of a further fiber composite workpiece.

As shown in FIG. 10 to FIG. 12, the fiber composite insert body 32 is removed, in particular is ground off, until the fiber composite insert body 32 is flush with the workpiece surface 20. It is ensured here that any functional coating 60 is not removed during the removal. The fiber composite insert bodies 32 are optionally provided with the functional coating 60 and are therefore integrated. One example for a functional coating 60 is, for instance, lightning protection material.

Figure 13:
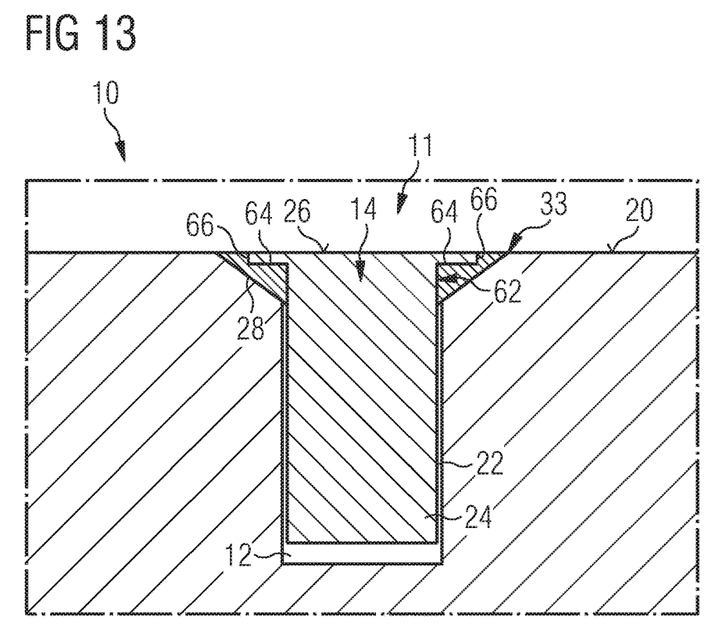
FIG. 13 shows a cross-sectional view with an inserted bolt.
Figure 14:
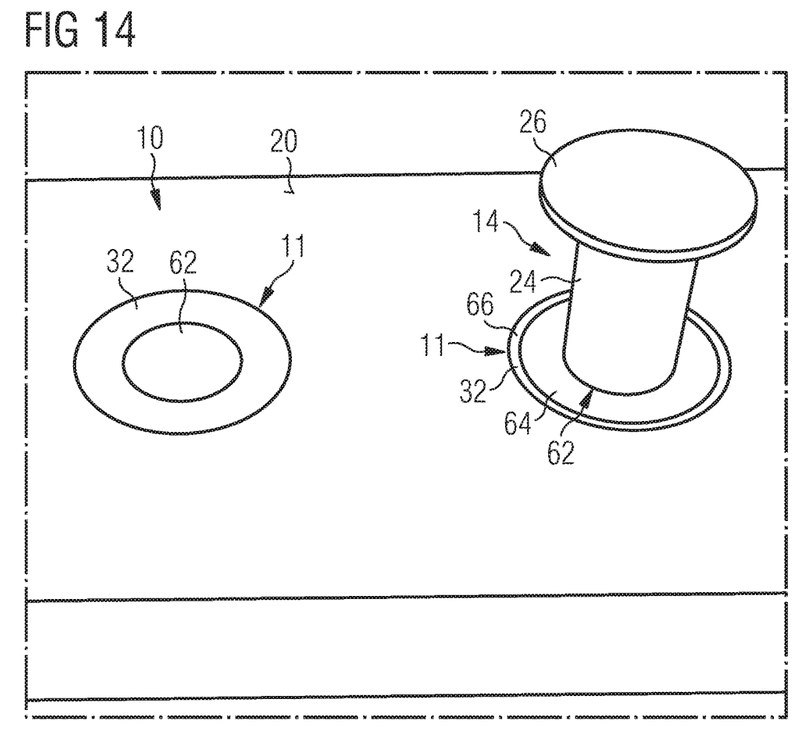
FIG. 14 shows a perspective view of a fiber composite workpiece.
Figure 15:
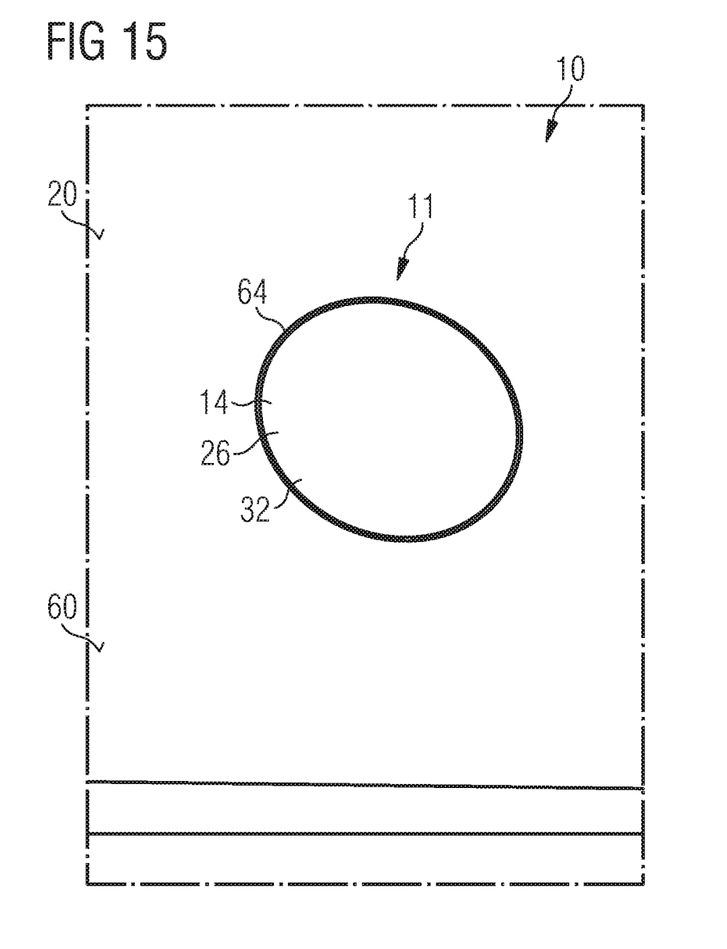
FIG. 15 shows a perspective view of a fiber composite workpiece from FIG. 14.

As shown in FIG. 13 to FIG. 15, the pilot opening 38 is widened, in particular is drilled out, in order to provide an end bolt opening 62. On account of the previously performed positioning and orientation, the end bolt opening 62 is also concentric and parallel with respect to the countersunk bolt opening 12. It should be noted that this is fundamentally also possible without the pilot opening 38, but can require more skill, for instance.

The end bolt opening 62 is then countersunk, in order to obtain an end countersunk bore 64. The end countersunk bore 64 has an end countersunk bore depth 66 which is configured in such a way that, when it is inserted into the end bolt opening, the bolt 14 is flush with the workpiece surface 20.

Figure 16:
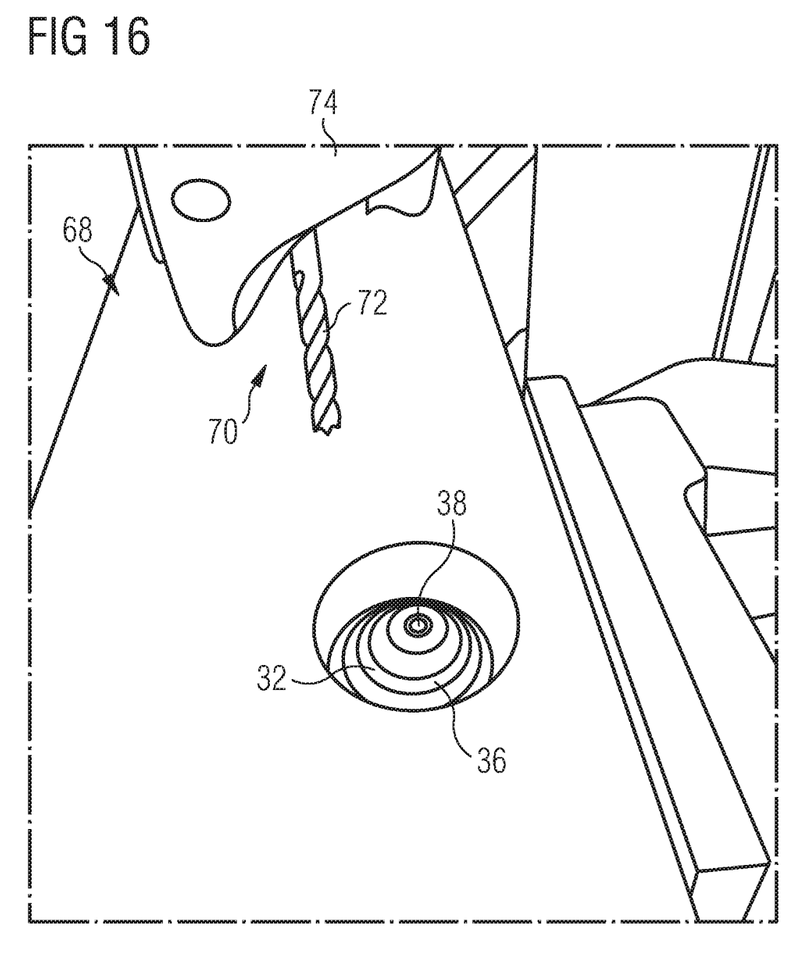
FIG. 16 shows a view relating to the cutting out of the fiber composite insert body.
Figure 17:
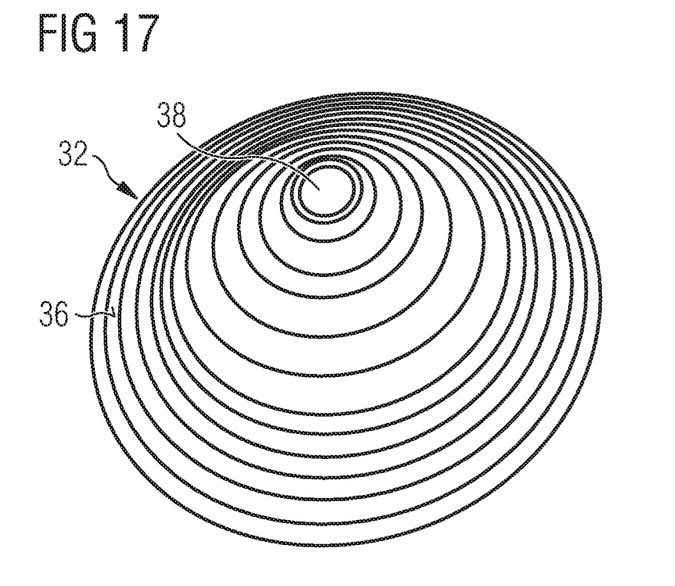
FIG. 17 shows a view of the fiber composite insert body which is extracted in FIG. 16.

It will be explained in greater detail in the following text on the basis of FIG. 16 to FIG. 18 how the fiber composite insert body 32 can be manufactured.

First of all, a fiber composite body 68 can be provided which is preferably manufactured from the same material as the fiber composite workpiece 10.

A fiber composite cutting tool 70 is used, in order to cut out the fiber composite insert body 32 from the fiber composite body 68. The fiber composite cutting tool 70 preferably has a central drill section 72 and a cutting head 74. During the cutting out, the drill section 72 forms the pilot opening 38, whereas the cutting head 74 forms the circumferential surface 36 of the fiber composite insert body 32.

The fiber composite insert body 32 can be cleaned by means of an ultrasonic bath, and can subsequently be used.

Figure 18:
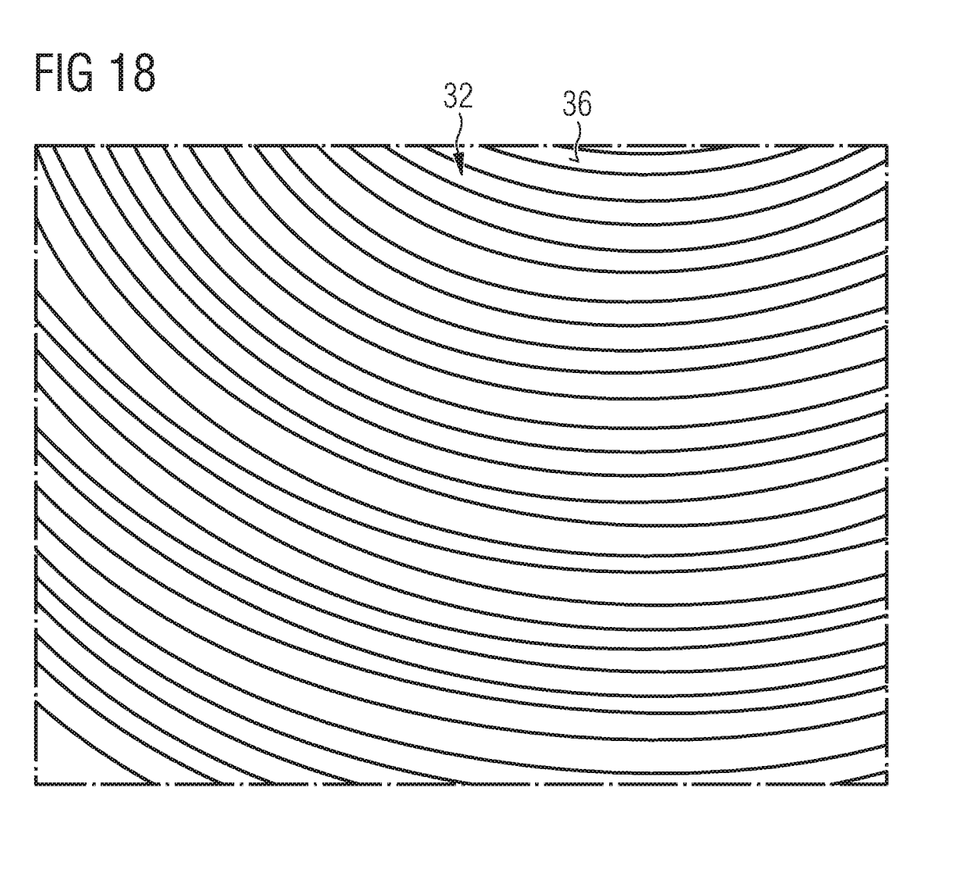
FIG. 18 shows an enlarged view of the cut surface of the extracted fiber composite insert body.

FIG. 18 shows the cut surface or circumferential surface 36 in greater detail. As can be seen, no fibers protrude from the cut surface, and merely relatively small machining marks can be seen.

It is therefore proposed, in order to reduce the processing time in the case of the repair of excessively countersunk bolt openings in fiber composite workpieces, to insert a fiber composite insert body made from fiber composite material into the excessively countersunk bolt opening. The insert body is adhesively bonded to the fiber composite workpiece. A new bolt opening is drilled into the insert, which bolt opening is subsequently countersunk to the correct countersunk bore depth. In the case of the method, a three-legged application tool can be used which positions and orients the fiber composite insert body correctly and presses it onto the fiber composite workpiece during the curing of the adhesive.

By way of the measures which are described herein, the processing time for machining and/or repairing excessively countersunk bolt openings in fiber composite workpieces can be reduced considerably, by almost up to seven hours per bolt opening. Furthermore, the method can be taught simply, and can therefore be carried out reliably by more workers than has been the case up to now.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF DESIGNATIONS

10 Fiber composite workpiece
11 Surface spot
12 Countersunk bolt opening
14 Bolt
16 Countersunk bore
18 Countersunk bore depth
20 Workpiece surface
22 Shank region
24 Bolt shank
26 Bolt head
28 Conical countersunk bore
30 Contact surface
32 Fiber composite insert body
33 Depression
34 Adhesive surface
35 Adhesive
36 Circumferential surface
38 Pilot opening
40 Application tool
42 Supporting frame
44 Tripod
46 Adhesive connection
48 Guide bolt
50 Pressing device
52 Elastic element
54 Helical spring
56 Setting element
58 Nut
60 Functional coating
62 End bolt opening
64 End countersunk bore
66 End countersunk bore depth
68 Fiber composite body
70 Fiber composite cutting tool
72 Drill section
74 Cutting head

The invention claimed is:

1. A machining method for modifying or repairing a surface spot of a workpiece surface of a fiber composite workpiece, the surface spot, first of all, not corresponding to a design specification, and corresponding to the design specification after the modifying or repairing, wherein the surface spot is a countersunk bolt opening, comprising the steps:

1.1 further countersinking the countersunk bolt opening to produce a contact surface and a depression;
1.2 placing a fiber composite insert body onto the contact surface, and fixing the fiber composite insert body on the fiber composite workpiece in the depression; and
1.3 producing an end bolt opening in the fiber composite insert body in accordance with the design specification.

2. The machining method as claimed in claim 1, wherein, in step 1.2, the fiber composite insert body is positioned concentrically with respect to the depression during the placing of the fiber composite insert body onto the contact surface.

3. The machining method as claimed in claim 1, wherein step 1.2 comprises at least one of:
pressing the fiber composite insert body onto the fiber composite workpiece; or
adhesively bonding the fiber composite insert body to the fiber composite workpiece.

4. The machining method as claimed in claim 1, wherein, in step 1.2, the fiber composite insert body protrudes beyond the workpiece surface in an axial direction of the depression, and step 1.2 comprises a removal of the fiber composite insert body until it is at least one of flat or flush with the workpiece surface.

5. The machining method as claimed in claim 4, wherein the removal takes place in such a way that, although any coatings of the workpiece surface are gripped, they are not removed.

6. The machining method as claimed in claim 5, wherein the coatings of the workpiece surface are roughened, but not removed, as they are gripped.

7. The machining method as claimed in claim 4, wherein, in step 1.2, the removal takes place by means of grinding.

8. The machining method as claimed in claim 1, wherein, after step 1.2 a functional coating, formed as lightning protection materials, is re-established.

9. The machining method as claimed in claim 1, distinguished by the step:
providing of the fiber composite insert body by cutting out or by drilling out the fiber composite insert body from a fiber composite body.

10. The machining method as claimed in claim 1, wherein, in step 1.2, at least one of:
the fiber composite insert body is positioned concentrically with respect to the countersunk bolt opening during placing of the fiber composite insert body onto the contact surface;
the fiber composite insert body has a pilot opening for at least one of positioning or orienting the fiber composite insert body during at least one of placing or fixing, the pilot opening at least one of being positioned concentrically with respect to the countersunk bolt opening or being oriented parallel to the countersunk bolt opening due to the placing of the fiber composite insert body onto the contact surface; or
the fiber composite insert body protrudes beyond the workpiece surface in an axial direction of the countersunk bolt opening, step 1.2 comprising a removal of the fiber composite insert body until it is flush with the workpiece surface.

11. The machining method as claimed in claim 10, wherein, in step 1.3, at least one of:
the end bolt opening is produced by way of enlarging of the pilot opening; or
the production takes place by means of drilling.

12. The machining method as claimed in claim 11, wherein the production takes place by way of drilling, and the drilling comprises reaming.

13. The machining method as claimed in claim 1, wherein the countersunk bolt opening has a countersunk bore depth, and the end bolt opening has an end countersunk bore depth, the countersunk bore depth and the end countersunk bore depth being defined in each case relative to the workpiece surface of the fiber composite workpiece, the machining method modifying the countersunk bore depth to the end countersunk bore depth, and comprising a step 1.4 which comprises countersinking of the end bolt opening to the end countersunk bore depth.

14. The machining method as claimed in claim 13, wherein the modifying of the countersunk bore depth comprises a reducing of the countersunk bore depth.

15. The machining method as claimed in claim 13, wherein, in step 1.4, the end countersunk bore depth is selected such that a bolt which is configured for the countersunk bolt opening and was not flush with the workpiece surface when the bolt was inserted into the countersunk bolt opening, is then flush with the workpiece surface when the bolt is inserted into the end bolt opening.

* * * * *